(12) United States Patent
Rosen

(10) Patent No.: US 6,198,904 B1
(45) Date of Patent: *Mar. 6, 2001

(54) INTERACTIVE LEARNING SYSTEM

(75) Inventor: Leonard J. Rosen, Brookline, MA (US)

(73) Assignee: Student Advantage, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/028,406

(22) Filed: Feb. 24, 1998

Related U.S. Application Data

(63) Continuation of application No. 08/529,986, filed on Sep. 19, 1995, now Pat. No. 5,772,446.

(51) Int. Cl.[7] .............................. G09B 5/00; G09B 19/00; G09B 7/00; G06F 7/00; G06F 17/00

(52) U.S. Cl. .................... 434/307 R; 434/118; 434/178; 434/323; 434/362; 434/317; 707/104

(58) Field of Search ................................ 434/178, 307 R, 434/322, 323, 362, 118, 317; 707/104

(56) References Cited

U.S. PATENT DOCUMENTS

| 5,063,600 | 11/1991 | Norwood | 382/186 |
| 5,241,671 | 8/1993 | Reed et al. | 707/104 |

*Primary Examiner*—John Edmund Rovnak
(74) *Attorney, Agent, or Firm*—McDermott Will & Emery

(57) ABSTRACT

An interactive learning system is disclosed that includes a note-making facility, a mentor facility, and an editor facility as its major subsystems. The note-making facility allows the user to create notes while scanning through an electronic text file that is accessible from a suitable memory space. The mentor facility provides content-specific information in response to the selection of certain passages or quotations from the text file by the user. The editor facility provides generalized learning strategies and recommendations useful in the analysis of text and the preparation of a written report. The information provided by the editor facility is generalized, and hence is not specific to the current text file; in contrast, the mentor facility is content-specific, and furnishes the user with information that is specifically related to the text under review.

21 Claims, 12 Drawing Sheets

- Premise: Victor, a gifted scientist, is capable of animating life.
- What ethical concerns does he, do you, have in such an act?
- Why does he pursue a womanless creation?
- How does he react to this scientific feat? Your reactions?

eld the
t almost
of life
nto the
lifeless thing that feet. It was already one in the morning; the rain pattered dismally against the panes, and my candle was nearly burnt out, when, by the glimmer of the half-extinguished light, I saw the dull yellow eye of the creature open; it breathed hard, and a convulsive motion agitated its limbs.

How can I describe my emotions at this catastrophe, or how delineate the wretch whom with such infinite pains and care I had endeavoured to form? His limbs were in proportion, and I had selected his features as beautiful. Beautiful! - Great God! His——————————

56 A

| HOME | WORKSPACE | ARCHIVE | SEARCH |

FIG. 5B

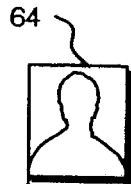

ries, and floundering desperately in a very slough of multifarious knowledge, guided by an ardent imagination and childish reasoning, till an accident, again changed the current of my ideas. When I was about fifteen years old we had retired to our house near Belrive, when we witnessed a most violent and terrible thunder-[storm]. It advanced from behind the mountains of Jura; and the thunder burst at once with frightful loudness from various quarters of the heavens. I remained, while the storm lasted watching its progress with curiosity and delight. As I stood at the door, on a sudden
beautiful oa{
house; and
had disappe
stump. Whe
tree shatter
by the shoc
I never behe Before this I
laws of elec As I stood at the door, on a sudden I beheld a stream of fire issue from an old and beautiful oak, which stood about twenty yards from our house; and so soon as the dazzling light vanashed, the oak had disappeared, and nothing remained but a blasted stump.

Victor sees power of lighting to destroy. Old oak becomes "a blasted stump. "Lighting = electricity

72

| 40A | CATEGORY: | Lightning |

40A

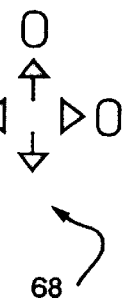

| HOME | WORKSPACE | ARCHIVE | SEARCH |

INTERACTIVE LEARNING SYSTEM

CROSS-REFERENCE TO RELATED APPLICATION

This is a continuing application of commonly-owned and copending patent application Ser. No. 08/529,986, U.S. Pat. No. 5,772,446 filed on Sept. 19, 1995, and which is hereby incorporated by reference.

FIELD OF THE INVENTION

The present invention relates to educational tools useful for instruction in the analysis of written materials and, more particularly, to a learning system that trains a user through interactive dialogue to better examine, comprehend, and prepare a synthesis of ideas generated during the reading of the written material.

BACKGROUND OF THE INVENTION

CD-ROM technology compresses vast amounts of information onto a single disk. For example, tens of thousands of pages devoted to materials as diverse as the collected works of Shakespeare and the technical specifications for nuclear reactors can be co-located on a single CD-ROM structure. By the end of the decade, the fiber-optic telecommunications infrastructure will make even this enormous amount of information on compact discs seem negligible, as telecomputers in an estimated 40 million homes will be linked to mainframe data bases. Thus, there exists unparalleled access to information in our society.

However, information by itself does not impart knowledge. Rather, knowledge requires an active learner who discovers patterns of meaning, understands contexts, is alert to differences, and who can generalize, predict, evaluate and, ultimately, form and defend opinions. For example, instant access to every occurrence of the word nature in the works of Shakespeare serves little purpose if one cannot read King Lear and see that a storm on a heath, a disturbance in nature, can mirror the turbulence of a man's soul. Data alone, no matter how vast or quickly accessed, is not knowledge; and while data-intensive technologies create unquestioned opportunities for learning, they also present a challenge: How can educators best help students convert data into knowledge when the desired skills in critical thinking are apparently in decline and the amount of information available to individuals it exploding and thereby exacerbating the problems of declining skills? This challenge to educators is both familiar and new. As always, the task of an educator is to help students think critically, to reflect, to synthesize, and to communicate. But educators now work in an environment where a learner's inability to convert data to knowledge will increasingly marginalize and overwhelm that learner.

The computer industry has attempted to develop software platforms that assemble this information and present it to users in a meaningful format. However, software vendors have been satisfied to simply present games or raw information. Among the almost 10,000 works available on CD for computer use, one-third are corporate, in-house databases; one-third are library data bases (such as Books in Print) for reference use; and one-third are independently distributed titles comprised mostly of interactive games. A small fraction of this last third is devoted to educational software, and of this even a smaller fraction is dedicated to college-level materials. Although educators appreciate the potential of using computer technology as a learning vehicle, there are few pedagogically sound and sustained strategies for helping adult computer users, whether at a college or professional level, to think critically about and synthesize the vast amounts of information now available at the click of a button.

Conventional approaches to learning may be broken down into two categories: non-interactive and interactive. In a non-interactive approach, the fundamental learning tool is reductive (i.e., the user is simply a passive recipient of whatever analysis or data the instructor deems necessary). One example of such a reductive system is the well-known Cliff Notes series used by students to prepare for exams. In Cliff Notes and other such reference materials, the instructor performs the entire analysis of the text and furnishes the user with the resulting conclusions. Accordingly, the basic feature of these tools is that all analysis and examination of the text and its underlying themes and ideas are performed entirely by an instructor, who then transforms the analysis into mere conclusory statements. Clearly, such an approach offers no formal instruction of the methodology undertaken by the teacher to arrive at the conclusions.

In an interactive approach, the most common instructional formats are query-based and a question and answer dialogue. Though interactive systems are more dynamic than non-interactive arrangements (to the extent that a user can pose questions from a predetermined set, instead of passively receiving all information), interactive systems do not necessarily promote learning; rather, they simply provide a rote retrieval of answers from a preset library based on the specific interrogation provided by the user (i.e., the query or question).

In disciplines such as science, mathematics, and economics, the conventional learning systems (either non-interactive or interactive) are adequate to provide the necessary instruction. The adequacy of such systems is due to the objective nature of the information and knowledge that defines these fields. Since the knowledge itself is rational-based and predicated on facts and physical relationships, learning may be accomplished through an understanding of theorems, postulates, and other objectively-based information that can readily be understood through query-based or question-and-answer formulations. However, in the field of literary composition, in which the material or subject matter is considered entirely subjective and thus open to varying degrees of interpretation and analysis, the need for a learning tool that promotes interrogation and dialogue with the user is most evident. Examples of such fields would include art, philosophy, religion and fiction. Accordingly, a need exists for an interactive learning system that particularly supports literary works.

OBJECTS OF THE INVENTION

It is a general object of the present invention to obviate the above-noted and other disadvantages of the prior art.

It is a specific object of the present invention to provide an interactive learning apparatus that supports a dynamic analysis of text-based material.

It is a further object of the present invention to develop a note-making facility to create notes that represent annotations of an electronic text being scanned.

It is a further object of the present invention to develop a mentor facility that provides content-specific information related to a particular passage of an electronic text that is being scanned for comprehension.

It is a further object of the present invention to provide such a mentor facility that operates as a background process, characterized by an activation sequence that is unknown to the user as the user proceeds through the text.

It is a further object of the present invention to provide an editor facility which may interact with a user who is scanning an electronic text, and which furnishes learning strategies to facilitate the structuring of essays, the organization of ideas, the composition of text, the assembling of notes into a format suitable for a reduction to writing, and the synthesis of ideas organized around a selected topic.

SUMMARY OF THE INVENTION

In one form of the invention, an apparatus organizes and files data from an electronic text file. The apparatus includes a scanner for interruptably and selectively scanning through the text file, and a data selector for selecting a portion of the text file being scanned by the scanner. A note creator unit responds to user input data and creates a notes file based on the user input data and which corresponds to the selected portion of the text file. A correlator correlates the notes file with the corresponding selected portion of the text file, wherein the correlation is represented by an associated text indicator. A filing system stores the notes files and the text indicator in accordance with filing criteria. The apparatus further comprises a data storage unit for storing the electronic text file.

The scanner includes a storage access unit for accessing the electronic text file stored within the data storage unit. A retrieval unit is coupled to the storage access unit and selectively retrieves a portion of the electronic text file from the data storage unit. The data selector preferably includes an interactive facility adapted to receive a user request to make a selection from the text file, for identifying the selected portion of the text file in accordance the user request, and for reproducing the selected portion as a text record. The interactive facility preferably includes a cursor mechanism, responsive to user commands and operative to identify text being scanned, for highlighting the selected portion of the text file.

The note creator unit includes a facility for generating a temporary work space suitable for the temporary storage of data therein. A data transfer apparatus transfers the text record into the temporary work space. An interface unit is adapted to receive the user input data and enter the user input data into the temporary work space.

The filing system includes a file manager that establishes filing criteria useful in the organization of the notes files, in response to user category requests each indicating the subject matter of an organizational field. A memory map generates a respective memory area for each user category request. A data transfer unit selectively transfers the notes files and associated text indicator into one of the memory areas according to a selection provided by the user.

In another form of the invention, an apparatus provides information relating to a text file. The apparatus includes a scanner for interruptably and selectively scanning through the text file, and a data selector for selecting a portion of the text file being scanned by the scanner. A mentor facility is provided to transmit information relating to the selected portion of the text.

The apparatus further includes a subsystem for identifying target sections of the text file deemed appropriate for providing information relating thereto. An information supply source supplies information relating to each of the identified target sections of the text file. Each of the target sections of the text file is then associated with its respective related information.

The mentor facility includes a subsystem for determining whether the selected portion of the text file represents one of the target sections of the text file. In the event of an affirmative determination, a data transfer unit transfers the information associated with the particular target section of the text file that is represented by the selected portion of the text file into a viewing space suitable for viewing by a user. The information related to a target section of the text file is content-specific to the text within the target section.

The mentor facility is preferably configured with a database including a plurality of knowledge files, each representing a content-specific record pertaining to the text within a respective one of the target sections of the text file. Each knowledge file is correlated with a text descriptor that is sufficient to identify the respective target section of the text file. A comparator compares the selected portion of the text file with each text descriptor associated with the knowledge files of the database. A match determination unit determines which comparison satisfies match criteria. An output subsystem provides the content-specific record that corresponds to the knowledge file correlated with the particular text descriptor which satisfies the match criteria.

The scanner and data selector are preferably operated as a foreground process characterized by a known activation sequence generated by the user. In contrast, the mentor facility is operated as a background process characterized by an unknown activation sequence generated by the user.

In another form of the invention, an apparatus analyzes the text of an electronic text file. The apparatus includes a scanner for interruptably and selectively scanning through the text file. An interface unit receives a user request for information relating to a learning strategy. A learning resource facility responds to this user request and provides information on the learning strategy. The subject matter of information provided by the learning resource facility includes essay preparation, the translation of reading comprehension into written expressions, recommended modes of critical analysis, assembling notes into informative and meaningful categorical groups, and synthesizing ideas discerned by the user during scanning of the text file.

In another form of the invention, an interactive learning apparatus analyzes the text of an electronic text file. The apparatus includes a scanner for interruptably and selectively scanning the text file, and a data selector for selecting a portion of the text file being scanned in accordance with a user request directed to text selection. A filing system receives input data provided by the user that is representative of user annotations pertaining to the selected portion of the text file. The filing system assemblies the input data into a notes file and correlates the notes file to the selected portion of the text file. The correlation is indicated by a correlation indicator. A data organizer organizes the notes file and the correlation indicator in accordance with predetermined organizing criteria. A mentor facility is provided that defines a mentorship function which facilitates an understanding of the content of the text file. The mentor facility determines whether the selected portion of the text file is encompassed by the scope of mentorship provided by the mentor facility, and generates information relating to the content of the selected portion of the text file upon an affirmative determination. An advisor subsystem responds to a user request directed to learning strategies and provides information useful in synthesizing and analyzing text.

BRIEF DESCRIPTION OF THE DRAWINGS

FIGS. 5A-F depict a series of computer screen displays to illustrate the operation of the interactive learning system according to the present invention.

Throughout the drawings the same or similar components, subsystems, or elements are identified by the same reference numeral.

DESCRIPTION OF THE PREFERRED EMBODIMENT

Figure 1:
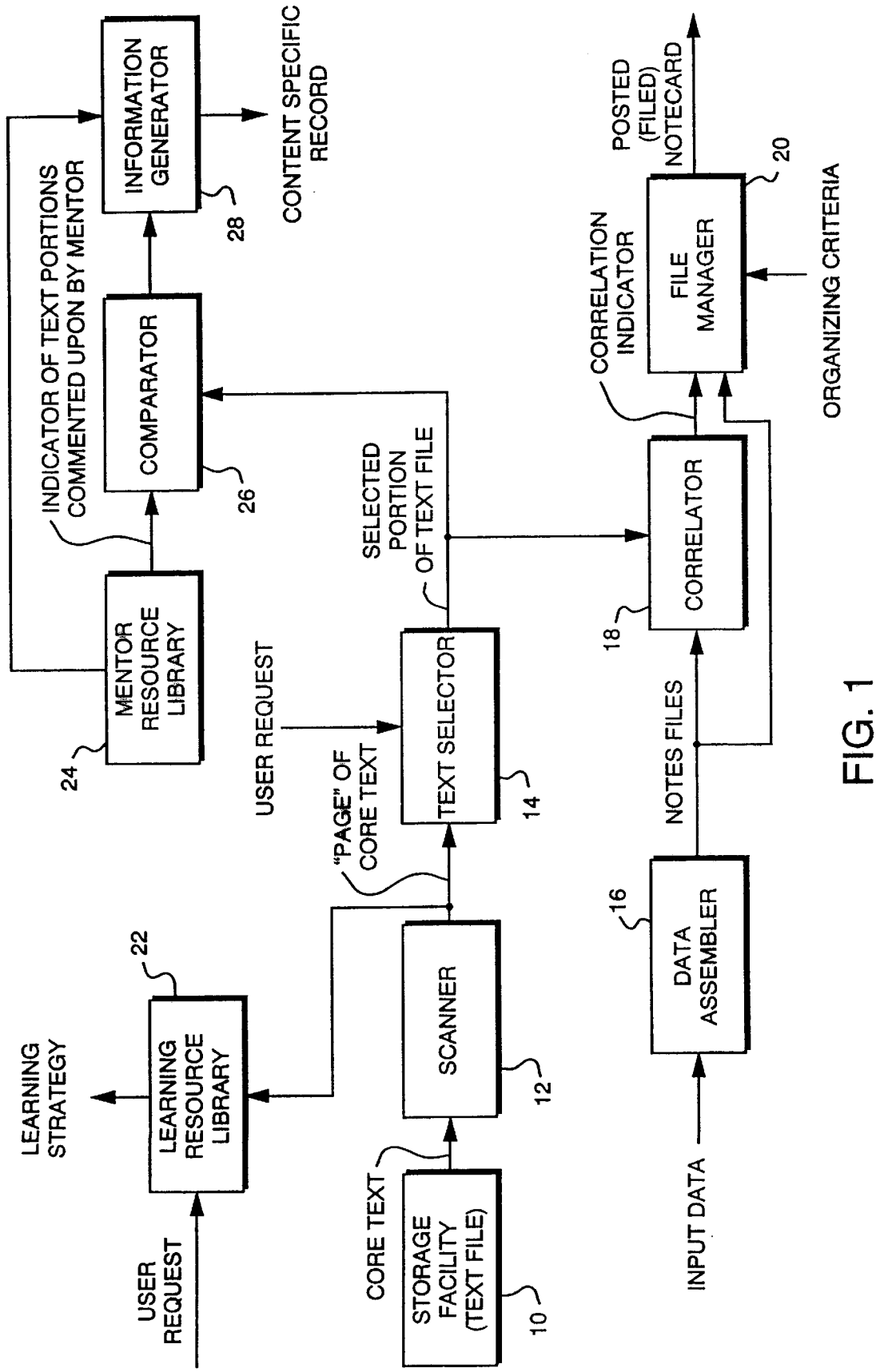
FIG. 1 is a system block diagram of an interactive learning system according to the present invention.

In its most general form, the present invention is directed to an interactive learning system that includes a note-making facility, a mentor facility, and an editor facility as its major subsystems. A user is able to activate any of the interactive learning facilities while scanning through an electronic text file that is stored in a suitable memory space. The note-making facility allows the user to create notes while advancing through the text file. These notes are comparable to annotations, and accompany certain passages designated by the user. The mentor facility provides content-specific information in response to the selection of certain passages or quotations from the text file by the user. The editor facility provides generalized learning strategies and recommendations useful in the analysis of text and the preparation of a written report. The information provided by the editor facility is generalized, and hence is not specific to the current text file; in contrast, the mentor facility is content-specific, and furnishes the user with information that is specifically related to the text under review.

As used herein, "core text" relates generally to an information or data set. Preferably, core text refers to documentation or other text-based source materials (e.g., literary works). For the system described herein, the core text is preferably converted into an electronic format suitable for electronic processing, scanning, and other computer-assisted functions. The core text is preferably maintained in a suitable storage medium, which is readily accessible by any of the subsystems of the present invention. A read only memory (ROM) is a preferred storage medium because it prevents corruption of the core text. Additionally, the core text may be stored on an optical disc or a magnetic memory. In applications involving the transmission of core text from a remote site in order to implement distance learning, the core text may be carried over a network system or satellite link. Distance learning is made necessary, for example, when a central academic facility provides resource and other educational materials to satellite campuses.

The learning system executes three principle modes of operation: a text mode, workspace mode, and archive mode. A text mode is used when the reader desires to advance sequentially through the electronic text file. The text mode is analogous to a user reading a book and, as described below, permits the contemporaneous preparation of notes that serve as annotations to the text. In a workspace mode, the reader synthesizes ideas and assembles notes created by the note-making facility as preparation, for example, in drafting an essay or report. The workspace mode is analogous to the activities undertaken by a reader after finishing a book. For example, the reader may synthesize ideas and notes created during the reading of the book, and prepare an outline suitable for drafting an essay or book report. In an archive mode, the reader is permitted access to a vast resource of supplemental information relating to the core text. The archive mode is analogous to the retrieval of supplemental resource materials to complement the reading activity. In particular, the archive mode offers additional information and relevant background information to improve upon an understanding of the text, including, for example, the author's context for writing such a work and the efforts of critics to examine the work. A general feature of these operational modes is that each mode is instantly accessible from any other mode currently activated.

Referring to FIG. 1, an interactive learning system is shown in block diagram format. The system includes a storage facility 10 for storing a text file known as core text. A user interacts with the core text using a scanner 12, which is adapted to receive the core text from storage facility 10 and generate an image suitable for viewing on an appropriate display monitor. In particular, scanner 12 accesses the storage facility and retrieves sequential segments of the core text file. The output of scanner 12 is provided as a "page" of the core text. As the user reads the text on a screen, for example, and requests the next page, the access means will advance the reader to the next sequential portion of the core text. In response to a user request indicating a segment of the text file being viewed on the screen, a text selector 14 captures this segment of the core text for further processing. For example, a cursor mechanism may be used to highlight a portion of the text being scanned.

In accordance with one aspect of the present invention, a note creation facility is provided including data assembler 16, correlator 18, and file manager 20. Data assembler 16 is responsive to input data for generating a notes file at an output port that represents a compilation of the input data. Correlator 18 correlates the notes file provided by data assembler 16 with the selected portion of the text file. This correlation is represented by a correlation indicator provided at the output of correlator 18. File manager 20 is operative to transfer the notes file and associated correlation indicator into a suitable memory space in accordance with organizing criteria provided by the user.

The organizing criteria used by file manager 20 represents a series of subject matter areas that the user assigns to a file storage space where the notes are stored. This function is especially important in literary works where a significant number of themes or ideas are identified within the entire literary work piece. To facilitate the synthesis of ideas after reading such a literary piece, it is important to define some type of organizing structure that permits a reader to place notes created during the reading of material into appropriately labeled subject matter groups, wherein all of the items within an organizational group relate to the same subject matter. Consequently, a reader need only refer to the organizational groups after reading a literary work piece in order to identify the relationship of the notes to the various ideas of the text. File manager 20 stores the correlation indicator and associated notes file into the appropriate memory space corresponding to the specific organizing criteria for that notes file.

In accordance with another aspect of the present invention, an editor facility is provided to instruct the reader on various modes of analyzing text, synthesizing ideas, and producing a work product based on the notes and other materials prepared by the reader during the course of scanning (i.e., reading) the core text. Referring again to FIG. 1, a learning resource library 22 responds to a user request for an edit function, and provides a learning strategy which instructs the user on the requested edit function.

In accordance with another aspect of the present invention, a mentor facility is provided to furnish content specific information on certain selected paragraphs, clauses or other sections of the core text. Referring to FIG. 1, the mentor facility includes a mentor resource library 24, a comparator 26, and an information generator 28. The mentor resource library 24 includes a plurality of records each comprising content specific information specifically relating to a corresponding passage of text within the core text. The mentor resource library 24 further includes a text indicator mechanism in each record that indicates the portion of text from the electronic text file that is commented upon by the mentor facility. In a preferred mode, the mentor facility operates as a background process in which the user cannot knowingly or intentionally invoke the mentor facility. In other words, the mentor facility is in a sense "invisible", whereby the user cannot know when the mentor will provide content specific information for the text that is selected by the user. In this manner, the user is prevented from deliberately referring to the mentor to gain insight into critically analyzing or interpreting a certain passage.

In order to determine when the selected portion of the text file is represented within the mentor resource library 24, a comparator 26 compares the selected portion of the text file against the entire array of text indicators in mentor resource library 24. If one of the comparisons satisfies a match criteria, information generator 28 access the mentor resource library 24 and retrieves the content specific information corresponding to the particular text indicator that is associated with the positive match.

Figure 2:
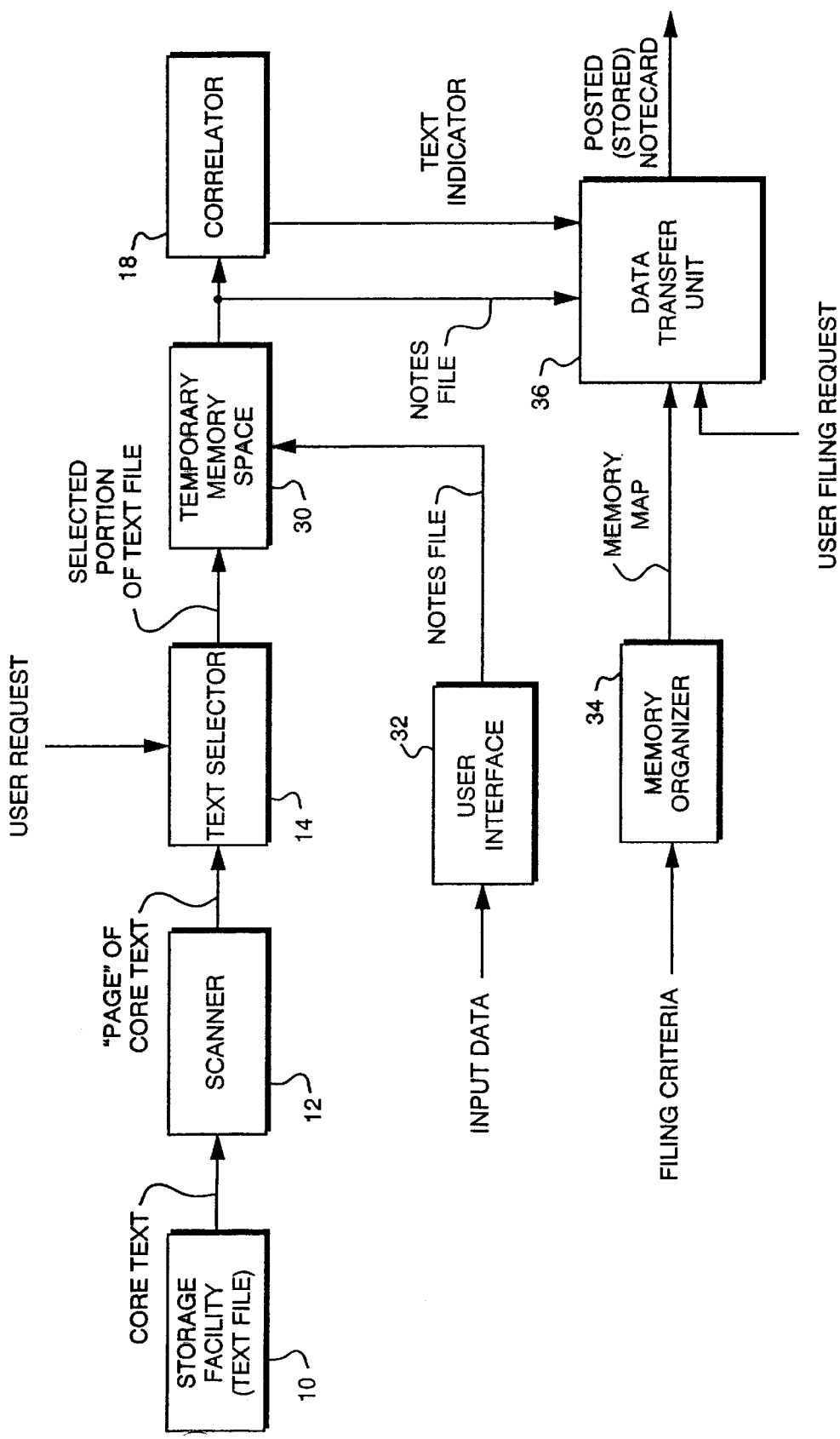
FIG. 2 is a block diagram of a note-making facility according to one aspect of the present invention.

Referring to FIG. 2, a block diagram is shown which further details the elements of the note creation facility according to the present invention. Storage facility 10, scanner 12, and text selector 14 are the same elements as those shown in FIG. 1 and thus function in an identical manner. As noted above, a portion of the core text is selected in accordance with a user request provided as an input to text selector 14. This selected portion of the text file is transferred into temporary memory space 30. The user interface 32 is responsive to input data representative of commentary that a user desires to attach as an annotation to the selected portion of the text file. The output of user interface 32 is a notes file that is also transferred into temporary memory space 30. Correlator 18 is identical to the like numbered element in FIG. 1, and therefore generates a text indicator that is indicative of the portion of the core text that is associated with the notes file. The filing system for placing the notes file and text indicator into memory is constructed from memory organizer 34 and data transfer unit 36.

Memory organizer 34 is responsive to filing criteria for generating a memory map that functions to reserve areas of memory each representative of a particular filing or organizational attribute. The filing criteria, for example, may correspond to the various plots or subplots that exist within the literary work. If the core text includes a data set representative of information relating to a manufacturing process, for example, the filing criteria may correspond to various actions that should be undertaken by a worker who is responsible for interpreting the data set and responding accordingly.

Thus, by way of memory organizer 34, the available memory space is divided into memory areas each designed to receive the particular notes files that are related by a common organizational or filing criteria. The memory map generated by memory organizer 34 is provided to data transfer unit 36 along with a user filing request that indicates the particular organizational or filing criteria under which the user wishes to file the notes file. In response to this memory map and the user filing request, data transfer unit 36 transfers the notes file and the text indicator into the appropriate memory area.

Figure 3A:
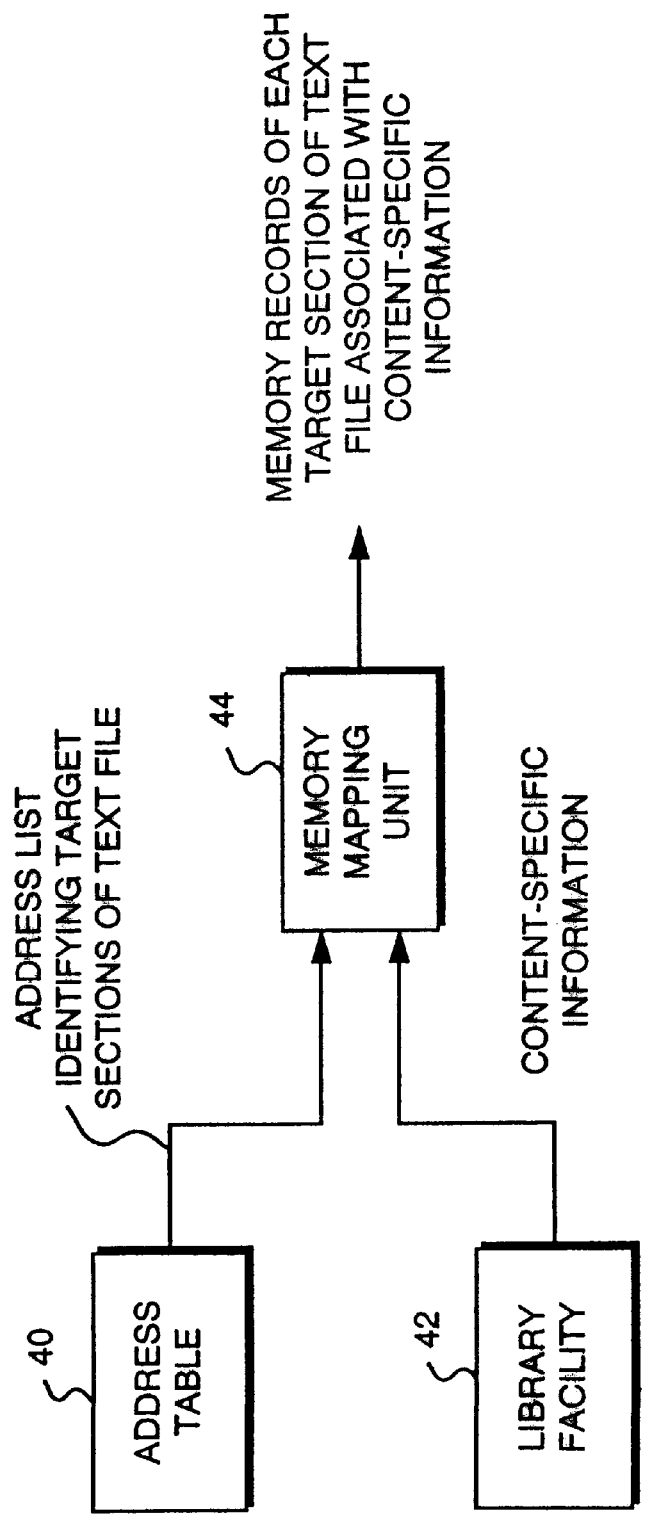
FIG. 3A is a block diagram of a system illustrating the construction of a mentor resource library according to another aspect of the present invention.

Referring to FIG. 3A, a block diagram is shown of the subsystems used by the mentor facility to generate content specific information and to associate such information with specified passages or paragraphs of text within the electronic text file. Address table 40 includes the memory address of all passages from the electronic text file for which the mentor facility desires to provide content specific information. As used herein, "target section" refers to a section, segment, phrase, passage, or other portion of the electronic text file that is associated with content specific information provided by the mentor facility. Accordingly, the address list provided by address table 40 identifies the target sections of the text file.

Library facility 42 includes all of the content specific information that the mentor facility wishes to provide to the user in connection with the current text file. A memory mapping unit 44 serves to link each target section (as represented by its respective memory address) with its corresponding content specific information. The output of memory mapping unit 44 is an array of memory records each including an identification of one of the target sections of the text file in conjunction with its associated content specific information.

Figure 3B:
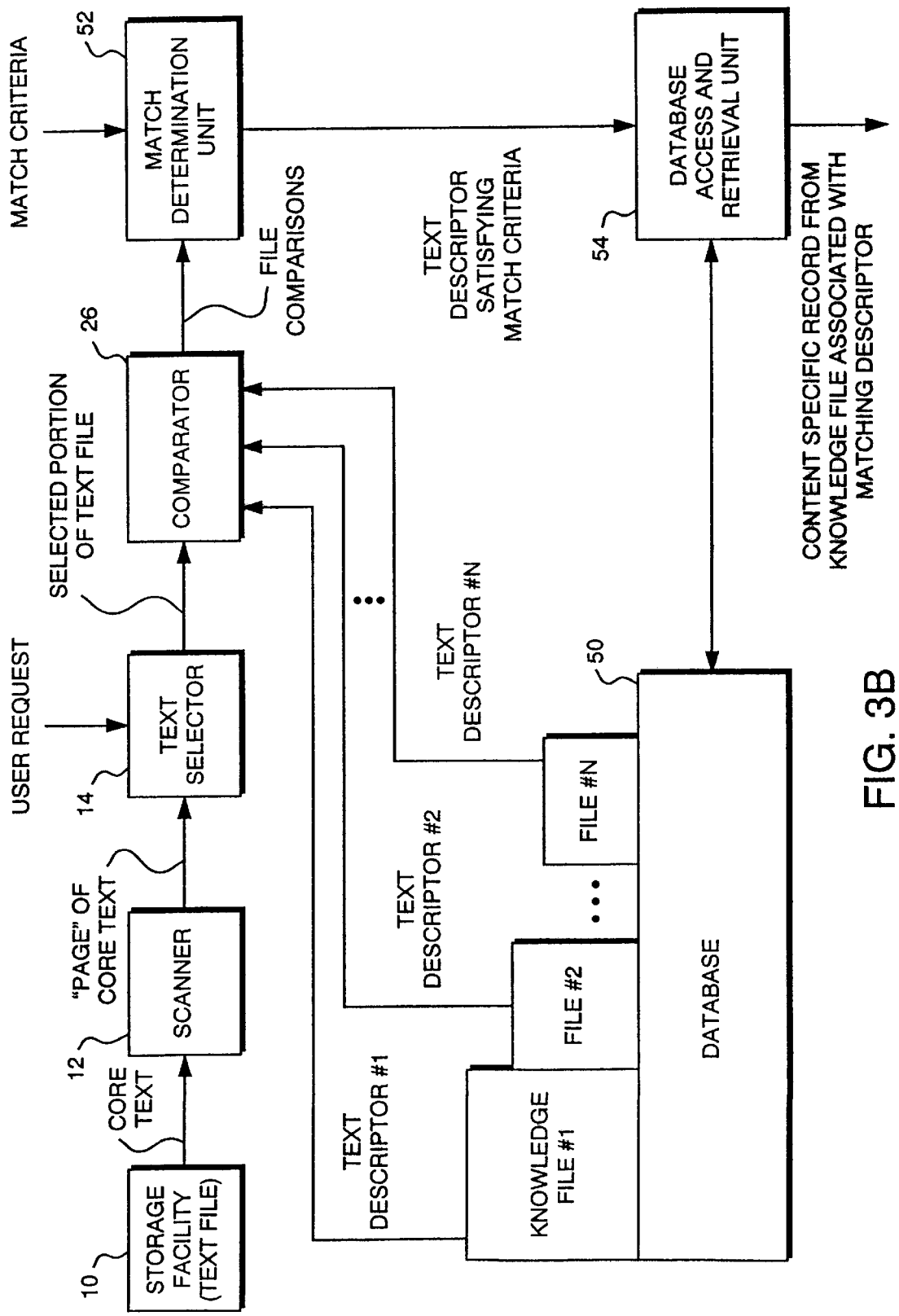
FIG. 3B is a block diagram of a mentor facility according to the present invention using the mentor resource library of FIG. 3A.

Referring to FIG. 3B, a block diagram is shown of a mentor facility in accordance with another aspect of the present invention, in which elements shown in FIG. 3A are represented by database 50. Database 50 includes a plurality of knowledge files each including content specific information and a text descriptor that indicates to which target section (i.e., passage of core text) the content specific information is related. Comparator 26 compares the selected portion of the text file with the entire array of text descriptors included within the knowledge files. This comparison is made to identify which knowledge file, if any, corresponds to the currently selected portion of the text file. The file comparisons provided by comparator 26 are forwarded to a match determination unit 52.

The match determination unit 52 reviews all of the file comparisons against established match criteria to identify which text descriptor satisfies the criteria. The particular text descriptor that satisfies the match criteria is then used as a pointer to its respective knowledge file. In particular, database access and retrieval unit 54 receives the text descriptor satisfying the match criteria and accesses database 50, retrieving the knowledge file corresponding to this text descriptor. Consequently, the output of unit 54 is an arrangement of content specific information which relates to the selected portion of the text file.

The mentor facility described above is configured to operate in a latent mode wherein the specific availability and accessibility of the mentor function is concealed from the attention of the reader, but becomes activated under the proper operational circumstances. For example, as the reader advances (i.e., scans) through the core text, the note creation facility described in connection with FIG. 2 is preferably invoked when the reader highlights a particular passage in order to compose an accompanying note. If this selected passage overlaps with a text portion identified by the mentor facility as being linked with content-specific information, the mentor facility leaves its latent mode and enters a disclosure mode characterized by the appearance of the mentor as a full-motion image on the screen display, accompanied by a viewing box including the content-specific commentary relating to the selected passage and a series of questions for stimulating thought and analysis of the passage. In addition to the disclosure mode, the mentor facility may operate in an overview mode, a context mode, and an archive complement mode.

At the beginning of a chapter, or at any other meaningful division point within the core text, the reader may engage the overview mode of the mentor facility by marking a mentor silhouette appearing on the screen adjacent the chapter heading, which causes the mentor to become expressed as a full-motion video image having an audio component. After the mentor delivers an overview of the upcoming chapter, the mentor image disappears and only the mentor silhouette icon remains on the screen, marking a temporary suspension of the overview mode until the next chapter is reached. A summary of the overview and any related questions posed by the mentor are assembled within a residue box that is displayed on the screen and may be saved for future retrieval. The mentor assists the reader in analyzing the core text but does not render any reductive interpretations.

It is assumed that the reader will encounter a number of particularly confusing passages while advancing through the core text file. Accordingly, the mentor facility includes a context mode activatable at each of these challenging passages and designed to display the mentor when the reader reaches any one of these passages. In particular, the mentor will appear as a silhouette icon adjacent to the passage; by activating the icon, a full-motion video image of the mentor will appear, followed by the mentor image audibly communicating a list of recommended background resource materials that the reader can access from the archive facility in order to provide a contextual overview that facilitates an understanding of the relevant passage. Finally, if the archive facility is activated by the reader, the same full-motion video and audio image of the mentor will appear to discuss and explain archival materials compiled by the mentor which support the core text. The archival material may include, for example, a video clip with a contemporaneous discussion by the mentor and video sequences which depict various adaptations of the underlying work, i.e., a musical, ballet, film, screenplay, and other interpretative performances based on the work.

Figure 4A:
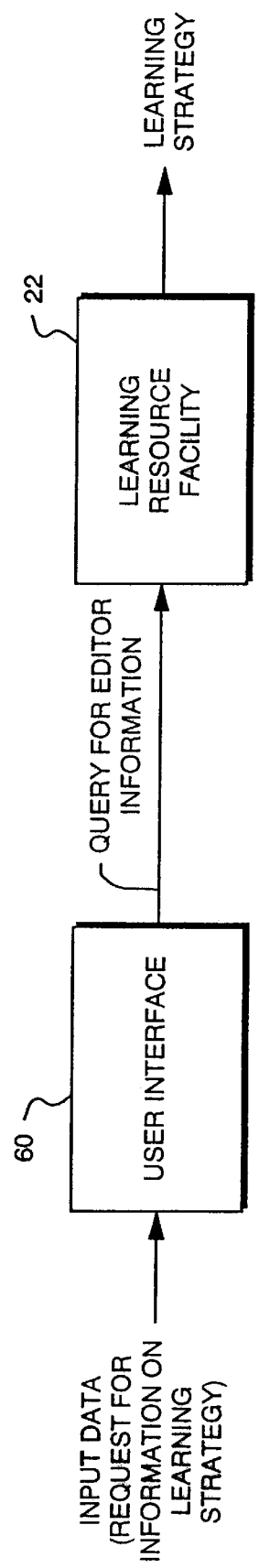
FIGS. 4A and 4B are, respectively, a generalized and further detailed block diagram of an editor facility in accordance with another aspect of the present invention.

Referring to FIG. 4A, a block diagram is shown of an editor facility in accordance with another aspect of the present invention. The editor facility includes a user interface 60 and a learning resource facility 22 identical to the learning resource library 22 of FIG. 1. User interface 60 is adapted to receive user input data that indicates a request for information on a particular learning strategy. This input data is formatted into a query command provided at an output of user interface 60. The learning resource facility 22 responds to the query command and provides a learning strategy directed to the requested edit operation.

Figure 4B:
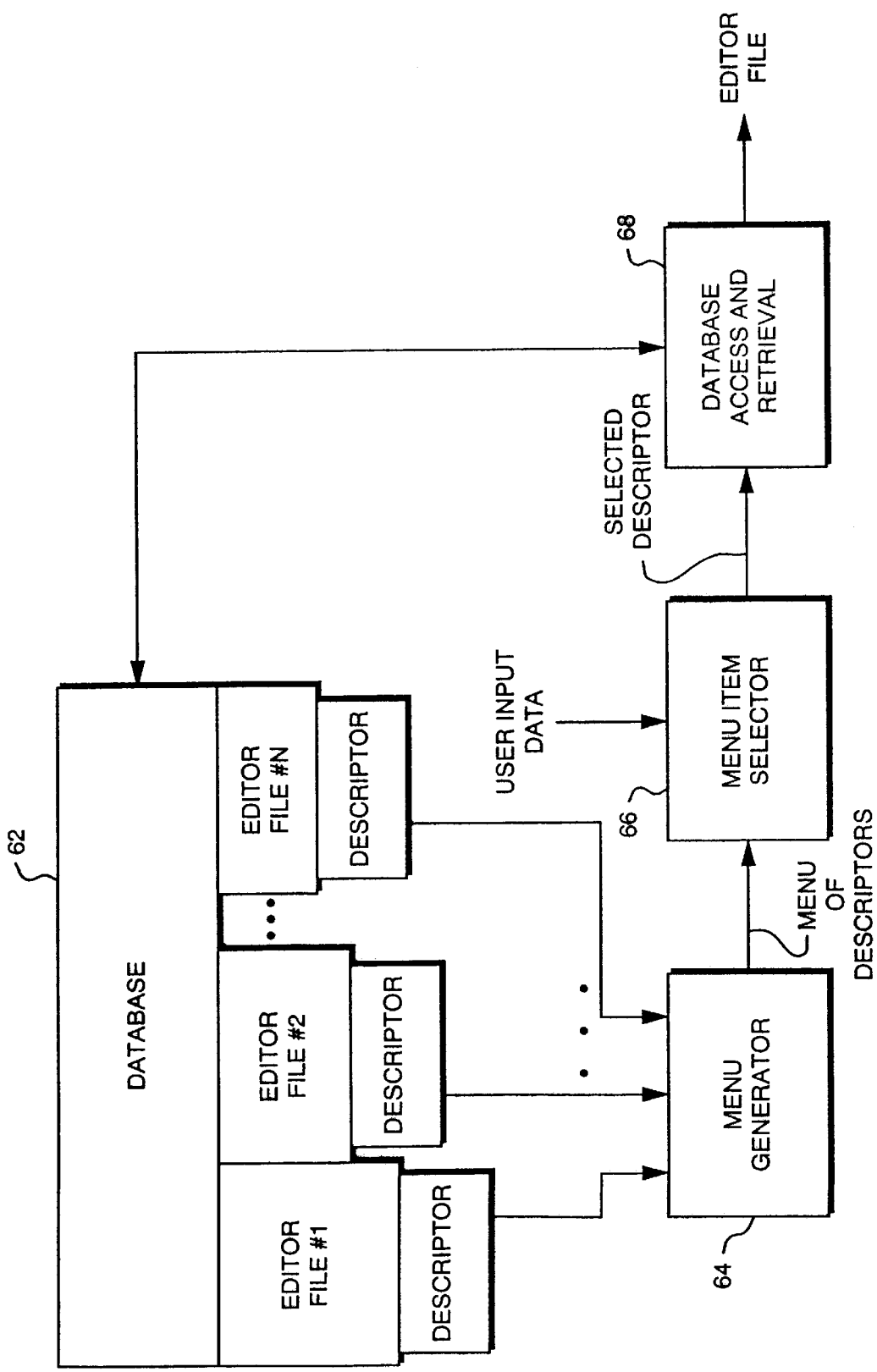

Referring to FIG. 4B, a further detailed block diagram is shown of the editor facility of FIG. 4A. The editor facility includes a database 62 including a plurality of editor files each representative of a learning strategy consistent with a specified editor function, and identified by a descriptor element. Menu generator 64 assembles the editor file descriptors into a menu suitable for viewing by the user. A menu item selector 66 is responsive to user input data representative of a requested edit function for selecting one of the items from the menu of descriptors. The selected descriptor, which corresponds to one of the editor files in database 62, is forwarded to database access and retrieval unit 68. This unit 68 accesses database 62 and retrieves the editor file corresponding to the selected descriptor. Unit 68 provides the particular editor file requested by the user at an output port.

In accordance with another aspect of the present invention, an archive facility is provided that may be accessed in one of four principal ways. As described above, the archive facility provides supplemental information, resource materials, and other documentation that complements the reader's comprehension and understanding of the core text. As one means for accessing the archive facility, a search engine is provided based on key words indexed to the type and character (i.e., subject matter) of supplemental information desired from the archive facility. Additionally, a time line may be provided with icons corresponding to various media elements. For example, if the core text corresponds to a literary piece adapted from a musical, the appropriate media element for instructing the reader might be a musical score or a choreography based on the core text. Furthermore, the archive facility is provided with an interactive search engine, wherein the mentor engages in dialogue with the reader to dynamically navigate along various pathways through the archive materials to acquire an understanding, for example, of the history of the core text, the author's life, or key patterns in the core text. Finally, the archive facility may be accessed through an author study which is supervised by a mentor. For example, the author study may include a biography of the author, a discussion on the author's writing of the core text, a discussion of contemporary critical reaction, or a preview of the author's study. Preferably, the mentor will appear in an interactive mode within a portrait photo on the screen to discuss the available archival materials identified by the archival research. The archive material may be compiled, for example, based on consultations with film archivists, art historians, music historians, and historians of popular culture. Preferably, at the end of every chapter is a list of selectively displayable archival items.

In accordance with another aspect of the present invention, the learning system described above can be configured in a multi-media environment characterized by the presentation of information and dialogue using various media elements. For example, when the mentor facility is invoked, the user may interact with the instructor (i.e., the mentor who developed the content-specific commentary) through a real-time or taped video transmission that appears within an image box on the screen display. Additionally, the archive facility may provide art works, film and audio clips, orchestral pieces, and animations through the appropriate media, provided that the hardware platform employed by the user is configured with the appropriate audio-visual interface to support these information formats.

In accordance with another aspect of the present invention, the interactive learning system may be utilized with a library of on-line textbook materials stored in a CD-ROM structure. The materials will represent a series of individual electronic core text files each corresponding to a literary work appropriate for the current reading audience. As an enhancement to this multi-media application, each of the subsystems that promote strategies for learning (i.e., mentor, editor, note-making, and archive facilities) may be structured in a multi-layered configuration in which each layer represents an independent operating process corresponding to a particular pedagogical level ranging from novice to expert instruction. This multi-layered approach allows the interactive learning system to tailor its learning strategies to the particular reader based on the difficulty of the selected core text and the level of education and experience of the reader. Therefore, the same core text can engage and challenge beginning, intermediate, and advanced students in pedagogically different but appropriate ways. The learning system would be configured with an apparatus for prompting the student to select the appropriate pedagogical layer and then activating the selected operational layer.

Although the embodiments described herein utilize literary materials as the core text, it should be apparent to those skilled in the art that other information or data sources may serve as the core text in accordance with the present invention. These additional sources are not limited to textual writings, but may consist, in part or in whole, of numerical or other technical data. For example, the mentor facility according to the present invention may be adapted to process a data set comprising information generated by manufacturing equipment located in an industrial plant, in which the information may be representative of the operating efficiency of a particular machine. In order that such data types can be processed by the interactive system of the present invention, a model of instructional thinking is necessary that performs pattern recognition to interpret the raw data and identify meaningful patterns developing within the data. This instructional model would be embodied within the mentor facility of the present invention.

The development of an appropriate mentor facility that is tailored to the current core text is generally based upon the premise that a certain identifiable logic structure exists to objectively analyze the situation or physical activity that produces the information defining the core text. In professional fields where experts are used to analyze and interpret data, the instructional model for the mentor facility is constructed by resolving the intuitive methodology of the relevant expert into its constituent analytical processes each representative of a distinct logic system. The mentor model is formulated from the integration of these individual logic systems. The intuitive process of the expert, in particular, represents the analytical framework undertaken by the expert to systematically review information pertinent to the field of expertise. Once the instructional model is developed and incorporated into the mentor facility, the mentor is capable of supplying a content-specific analysis relevant to the current data set. This content-specific analysis may be performed and then stored in memory prior to execution of the interactive learning system, or may be carried out in real-time as the user is advancing through the core text. Additionally, the learning strategies provided by the editor facility are tailored to the information being processed and analyzed by the operator using the interactive learning system described herein.

The functions described above and the underlying structures are generally implementable as software processes executed on a programmed general purpose computer. Accordingly, the specific hardware configuration should not serve as a limitation of the present invention, as it should be apparent to those skilled in the art that any computing facility may be used to implement the present invention. One resultant advantage is that the present invention may be portable among a variety of hardware platforms.

FIGS. 5A–F depict photocopied reproductions of a series of representative computer-generated screen displays that sequentially appear on a viewing terminal during the execution of a computer implementation of the interactive learning system of the present invention. As discussed below, the screen displays generally illustrate the functionality of and interaction with the interactive learning system, and may depict such features as the core text currently being scanned, the functions available to the user (e.g., invoke editor or note-making facility), the current mode of operation (i.e., text, workspace, or archive), and responses (if any) provided by the mentor (i.e., content-specific information relevant to highlighted text).

Figure 5A:
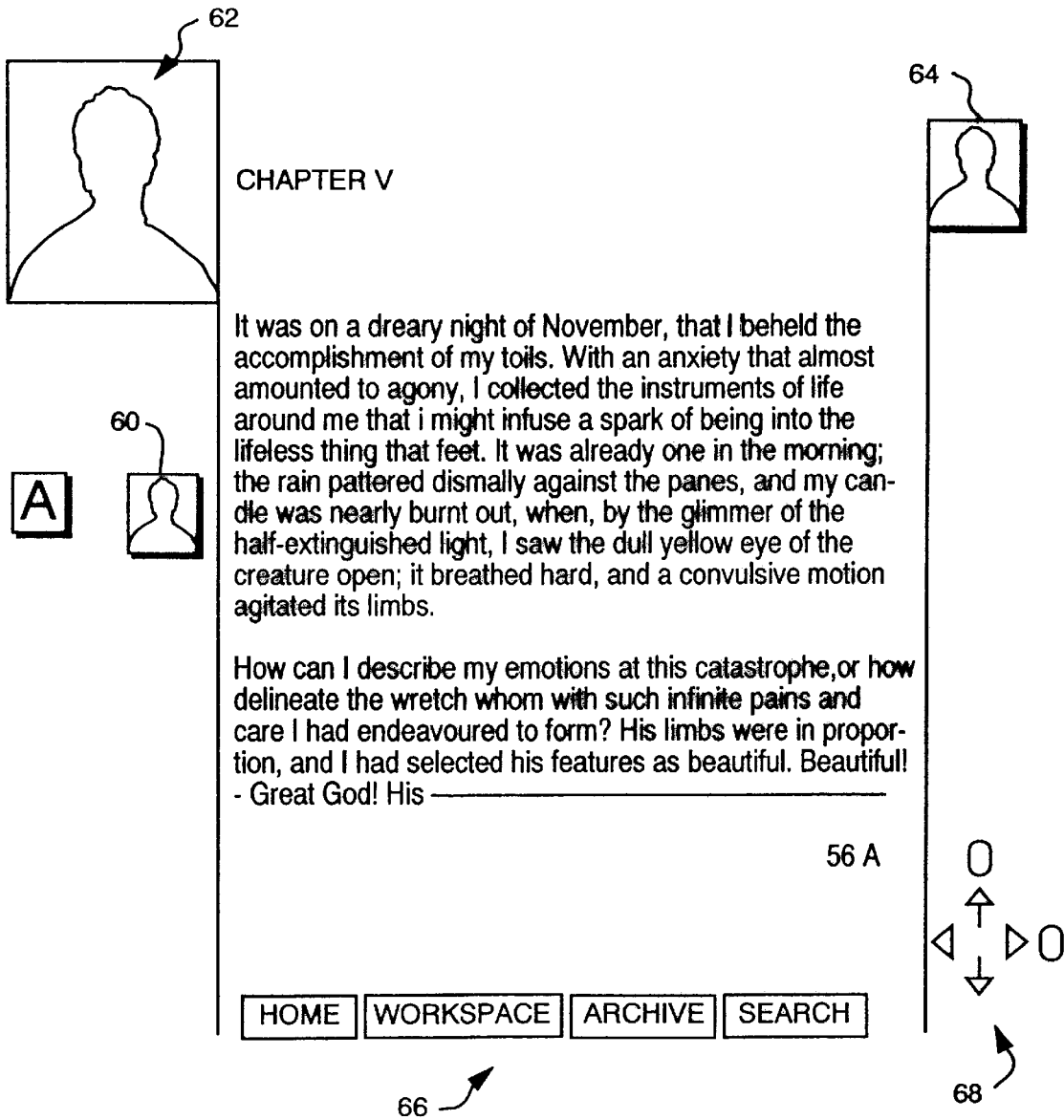

Referring to FIG. 5A, the screen display illustrates the text mode and depicts a representative section of the text. As described above, the text mode supports the following principal activities: document scanning, note-making, category construction (to organize the filing of notes), the juxtaposition of notes within categories, and interaction with the archive, mentor and editor facilities.

The screen display includes a mentor icon 60 to signify the beginning of a chapter and the availability of the overview mode of the mentor facility. As shown, mentor icon 60 takes the form of a silhouette of the mentor. In order to invoke the overview mode, the reader marks the mentor icon 60 (e.g., by clicking the icon with the screen cursor). The mentor will appear as a full-motion video image 62 having an audio capability. The mentor will speak and provide an overview of the upcoming chapter and pose questions designed to stimulate critical thinking pertinent to this chapter. An editor icon 64 also appears on the screen and may be similarly marked using the cursor to invoke the editor facility. The editor icon 64 likewise takes the form of a silhouetted individual (i.e., the editor). By invoking the editor facility, a menu overlay (not shown) will appear to furnish generalized strategies for reading, and identifying patterns, connections, and other relationships within the core text. A cursor pattern 68 indicates the currently available scanning directions through the core text, i.e., the reader may move up or down within the currently displayed text, advance to the next page of the core text, or return to the previous page.

The screen display is provided with four panel elements 66 each having a descriptive label and designed to activate a respective function or facility. The "Home" key activates a home space that reveals an image of the author's study, which may include materials used by the author in preparing the core text. By using the cursor, the reader may view an enhanced image of certain selected items within the author's study. These materials would preferably be made available by the archive facility. The "Workspace" key activates the workspace mode; the "Archive" mode activates the archive facility; and the "Search" key allows the reader to search through the core text using a variety of search indices including, inter alia, page number, keywords, or entire phrases or blocks of text.

Referring to FIG. 5B, the screen display illustrates an output sequence from the mentor facility after the mentor of FIG. 5A has finished the introductory discussion of the upcoming chapter. A residue box 70 is used to summarize the major points of the mentor discussion and to reproduce the questions posed by the mentor. The information within this residue box 70 may be saved for subsequent retrieval.

Referring to FIG. 5C, the screen display illustrates the note-making facility. Upon the selection of a particular passage of text (i.e., by using the highlight function), a note box 72 appears as an overlay to the core text and includes the selected text (i.e., the paragraph beginning with "As I . . . "). The reader can then insert commentary into the note box 72, which is represented by the sentence following the core text quotation. The quotation and reader commentary together constitute a note. The reader can then save the note as a free note (i.e., without assigning it to a particular category) or can save it in an assigned category (e.g., "Lightning") that currently exists or is generated by inserting the desired category name into the indicated category box. When a note is assigned to a category, this action is comparable to placing the note into an established file folder.

Figure 5D:
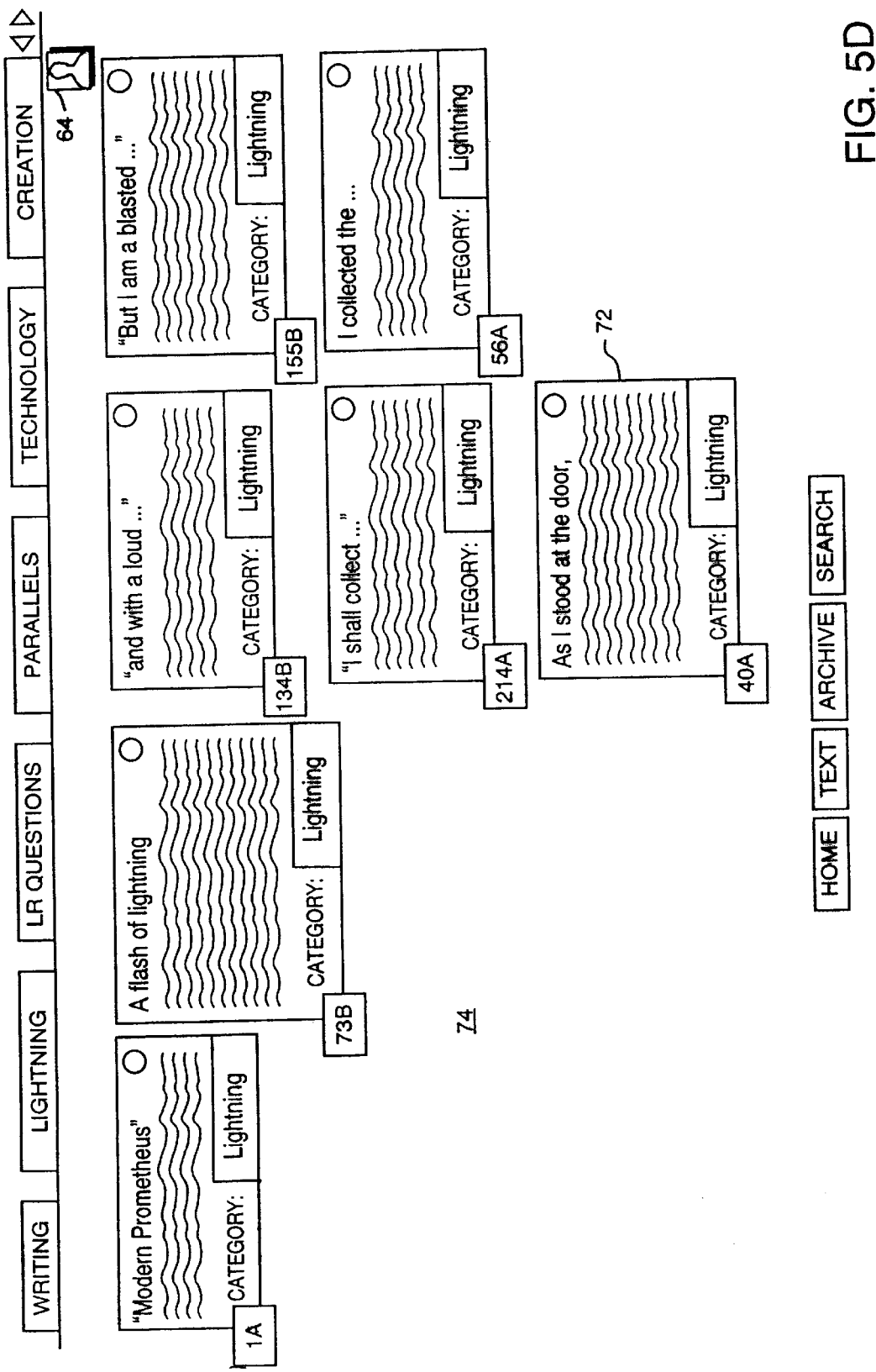

Referring to FIG. 5D, the screen display illustrates the workspace mode which supports the following principal activities: displaying, managing, and examining the notes records; forging connections and establishing relationships among the notes; and formulating a claim based on the notes, core text quotations, and other available material. Essentially, the workspace mode provides a workspace area 74 that functions as a desk area where the reader can assemble the notes created during the reading of the core text, and then access basic word processing functions (via activation of the editor facility) to draft extended versions of the notes or formulate an essay.

The screen display depicts the assembled collection of potentially relatable notes (illustrated by FIG. 5C) that were compiled using the note-creation facility, wherein each note is identified with the page number of the core text file where the relevant quotation can be found. The uppermost line of the screen display provides the indicated list of user-defined filing categories (i.e., "Lightning", "LR Questions", "Parallels . . .", "Technology" and "Creation") The writing function is invocable in conjunction with the editor facility (discussed below).

Figure 5E:
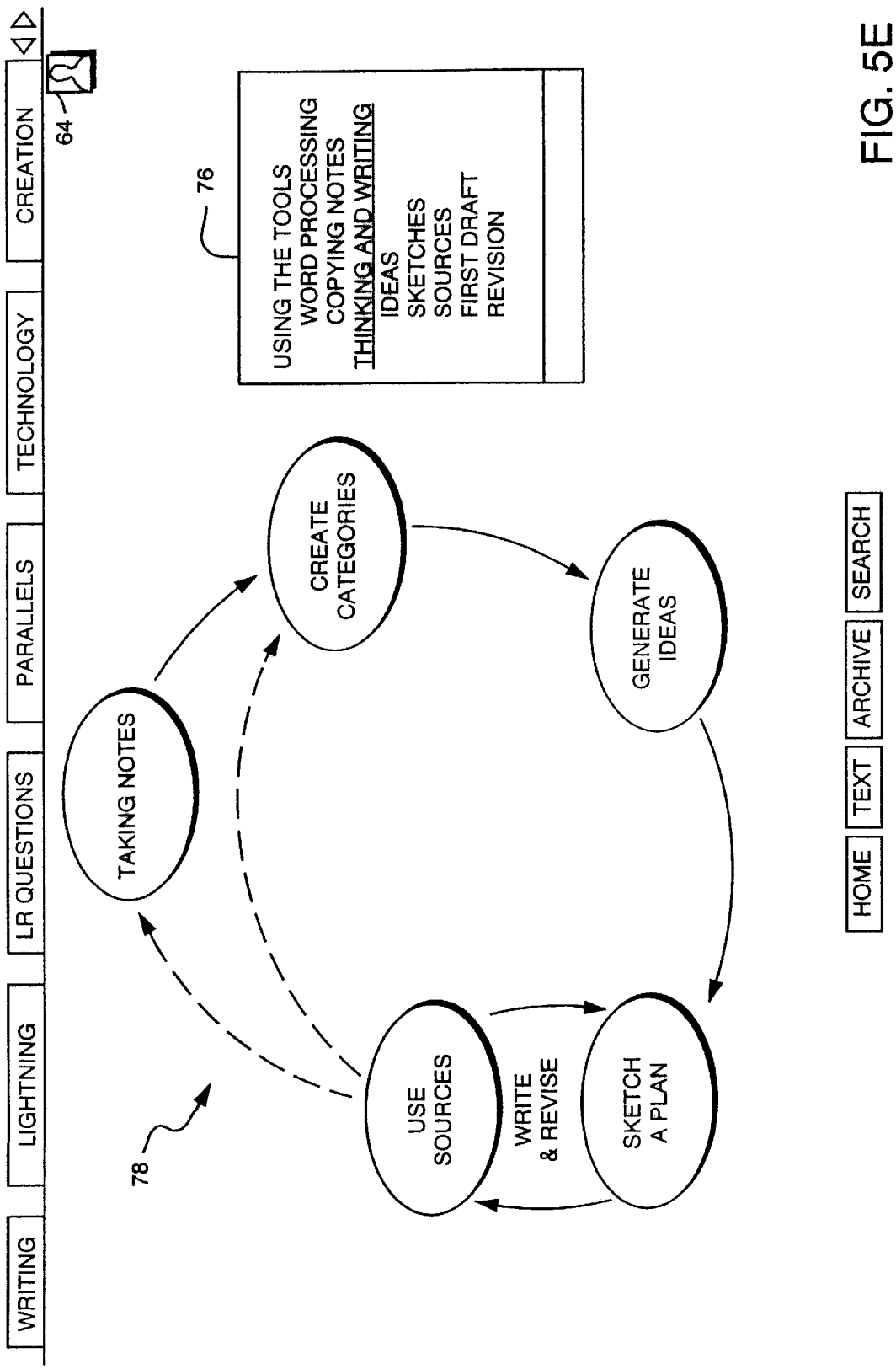

Referring to FIG. 5E, the screen display illustrates the information generated by the editor facility when the writing key is engaged during the workspace mode. The editor facility provides a menu 76 of items that instruct the reader on basic word processing capabilities (e.g., copying notes) and the mechanics involved in the preparation and development of a report. The recommendations provided by the editor facility are logically presented to the reader using an animation sequence 78.

Figure 5F:
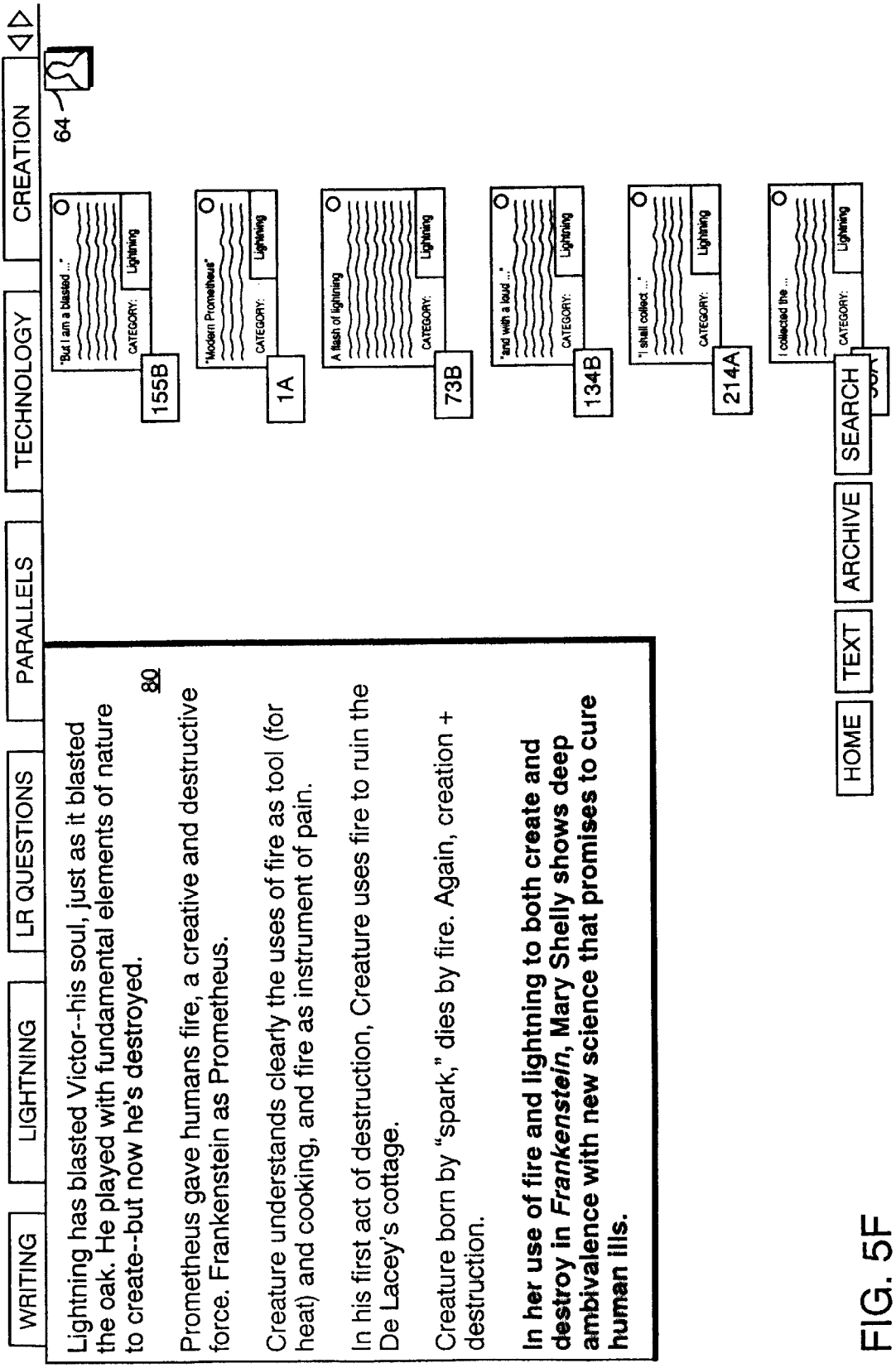

Referring to FIG. 5F, the screen display illustrates the development of an essay within a writing space 80. Based upon the assembled notes related to the indicated category (i.e., "Lightning"), the student attempts to formulate a claim that purports to give meaning to the underlying quotations. Within the writing space 80, the student can insert the appropriate portions of the notes or quotations (using a "cut-and-paste" operation) and then draft the claim, which is represented by the ending sentence.

Therefore, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for organizing and filing data from an electronic text file, said apparatus comprising:

scanner means for interruptably and selectively scanning through said text file;

selection means, coupled to said scanner means, for selecting a portion of the text file being scanned by said scanner means;

note creation means, responsive to user input data, for creating a notes file based on said user input data and corresponding to the selected portion of said text file;

correlation means for correlating said notes file with said corresponding selected portion of said text file, said correlation being represented by an associated text indicator; and filing means for storing said notes files and said text indicator in accordance with filing criteria.

2. The apparatus as recited in claim 1, further comprising:

data storage means for storing said electronic text file.

3. The apparatus as recited in claim 2, wherein said data storage means includes a read only memory (ROM).

4. The apparatus as recited in claim 3, wherein said ROM is a magnetic storage medium.

5. The apparatus as recited in claim 3, wherein said ROM is an optical storage medium.

6. The apparatus as recited in claim 2, wherein said scanner means comprises:

access means for accessing said electronic text file stored within said data storage means; and retrieval means, coupled to said access means, for selectively retrieving a portion of said electronic text file from said data storage means.

7. The apparatus as recited in claim 6, further comprising:

display means for displaying the portion of said electronic text file retrieved by said retrieval means.

8. The apparatus as recited in claim 1, wherein said selection means comprises:

interactive means, adapted to receive a user request to make a selection from said text file, for identifying the selected portion of said text file in accordance with said user request and reproducing said selected portion as a text record.

9. The apparatus as recited in claim 8, wherein said interactive means comprises:

cursor means, responsive to user commands and operative to identify text being scanned, for highlighting the selected portion of said text file.

10. The apparatus as recited in claim 8, wherein said note creation means comprises:

means for generating a temporary work space suitable for the temporary storage of data therein;

transfer means for placing said text record into said temporary work space; and interface means, adapted to receive said user input data, for entering said user input data into said temporary work space.

11. The apparatus as recited in claim 1, wherein said correlation means comprises:

text indication means for generating a file pointer indicative of the selected portion of said text file corresponding to said notes file; and association means for associating said file pointer with said notes file.

12. The apparatus as recited in claim 11, wherein said text indication means comprises:

address means for identifying an electronic address of the selected portion of said text file.

13. The apparatus as recited in claim 12, wherein said association means comprises:

means for electronically linking said electronic address to said notes file.

14. The apparatus as recited in claim 1, wherein said filing means comprises: a file manager system including:

means, responsive to user category requests each indicating the subject matter of an organizational field, for establishing filing criteria useful in the organization of said notes files;

means, responsive to each user category request, for generating a respective memory area identified by said user category request; and transfer means for selectively transferring said notes files and said associated text indicator into one of said memory areas according to a selection provided by the user.

15. An interactive learning apparatus for analyzing the text of an electronic text file, said apparatus comprising:

scanner means for interruptably and selectively scanning said text file;

selection means, coupled to said scanner means, for selecting a portion of the text file being scanned in accordance with a user request directed to text selection;

filing means, coupled to said selection means, for receiving input data provided by said user that is representative of user annotations pertaining to the selected portion of said text file, assembling said input data into a notes file, and correlating said notes file to the selected portion of said text file, said correlation being indicated by a correlation indicator; and organization means, coupled to said filing means, for organizing said notes file and said correlation indicator in accordance with organizing criteria.

16. The apparatus as recited in claim 15, further comprising:

archive means for providing archival information in accordance with a user request directed to archive material.

17. Electronic note making and filing apparatus, comprising:

(A) means for selecting only a portion of an electronic text file and for reproducing the portion as a text record;

(B) means for creating a notes file corresponding to the text record and for annotating the notes file with user-defined commentary;

(C) memory divided into storage areas, each of the areas being constructed and arranged for receiving notes files related by a common organizational criterion provided by the user;

(D) means for filing the notes file in one of the storage areas; and (E) means for displaying a plurality of notes files that are filed within at least one of the storage areas.

18. Electronic note making and filing apparatus according to claim 17, wherein the means for selecting comprises (i) a scanner adapted to receive the text file and to display an image suitable for viewing on a display monitor, (ii) a text selector for selecting the portion of the text file, the portion being designated by the user.

19. Electronic note making and filing apparatus according to claim 18, wherein the text selector comprises a cursor mechanism.

20. Electronic note making and filing apparatus according to claim 18, further comprising a user interface for accepting user inputs representative of the commentary that the user desires to attach as an annotation to the selected portion of the text file.

21. Electronic note making and filing apparatus according to claim 17, further comprising means for organizing the memory such that each storage area is representative of an electronic file folder identified by an assigned category.

* * * * *